United States Patent
Chen et al.

(10) Patent No.: US 10,969,881 B2
(45) Date of Patent: Apr. 6, 2021

(54) WIRELESS DOCKING STATION

(71) Applicant: CHICONY ELECTRONICS CO., LTD., New Taipei (TW)

(72) Inventors: Chih-Hao Chen, New Taipei (TW); Heng-Chang Pai, New Taipei (TW)

(73) Assignee: Chicony Electronics Co., Ltd., New Taipei (TW)

( * ) Notice: Subject to any disclaimer, the term of this patent is extended or adjusted under 35 U.S.C. 154(b) by 0 days.

(21) Appl. No.: 16/457,055

(22) Filed: Jun. 28, 2019

(65) Prior Publication Data
US 2020/0183505 A1    Jun. 11, 2020

(30) Foreign Application Priority Data

Dec. 10, 2018 (TW) ................................. 107144402

(51) Int. Cl.
*G06F 3/0354* (2013.01)
*G06F 3/038* (2013.01)
*G06F 1/16* (2006.01)
*G06F 3/16* (2006.01)
*H02J 7/00* (2006.01)

(52) U.S. Cl.
CPC ........ *G06F 3/03545* (2013.01); *G06F 1/1632* (2013.01); *G06F 3/0383* (2013.01); *G06F 3/16* (2013.01); *H02J 7/00* (2013.01)

(58) Field of Classification Search
CPC .. G06F 3/03545; G06F 3/0383; G06F 1/1632; G06F 3/16; G06F 3/165; G06F 3/039; G06F 2200/1632; H02J 7/00; H02J 7/0042; H02J 7/007; H02J 2207/30

USPC ......................................................... 345/179
See application file for complete search history.

(56) References Cited

U.S. PATENT DOCUMENTS

| 5,581,783 A | 12/1996 | Ohashi |
| 9,096,093 B2 * | 8/2015 | Pemberton-Pigott ........................ B43K 23/12 |
| 10,104,217 B2 | 10/2018 | Kim et al. |

(Continued)

FOREIGN PATENT DOCUMENTS

| CN | 107924213 A | 4/2018 |
| TW | M413914 U | 10/2011 |

(Continued)

*Primary Examiner* — Koosha Sharifi-Tafreshi
(74) *Attorney, Agent, or Firm* — Muncy, Geissler, Olds & Lowe, P.C.

(57) ABSTRACT

A wireless docking station is disclosed. The wireless docking station is used for arranging a stylus for signal transmission with an external electronic device. The stylus includes an image capturing module and a first connection port. The wireless docking station includes a placement, a second connection port, a wireless transmission module, a microphone, and a speaker. The placement is used for placing the stylus. The wireless transmission module is connected to the external electronic device, when the image capturing module captures an image, the wireless transmission module transmits the image to the external electronic device. The microphone is used for receiving an external sound signal and transmitting the external sound signal to the external electronic device via the wireless transmission module. The speaker is used for receiving and outputting an output sound signal from the external electronic device via the wireless transmission module.

9 Claims, 6 Drawing Sheets

(56) References Cited

U.S. PATENT DOCUMENTS

2009/0256955 A1* 10/2009 Kuo .................. G06F 1/1686
                                              348/376
2014/0168176 A1*  6/2014 Nowatzyk ............ G06F 3/0346
                                              345/179

FOREIGN PATENT DOCUMENTS

TW          M453310 U      5/2013
WO    WO-2018194557 A1 * 10/2018 ........... G06F 1/1643

* cited by examiner

WIRELESS DOCKING STATION

BACKGROUND OF THE INVENTION

1. Field of the Invention

The present invention relates generally to a wireless docking station, and more particularly, to a wireless docking station which can work with a stylus.

2. Description of the Related Art

With the advancement of smart phones and networks, the application of technology products and mobile phone software has been widely deployed in the daily life, and has also led to the rise of the Internet of Things (IoT). The Internet of Things has been widely applied in various fields such as health care, home appliances, technology products, and security monitoring. Take stylus as an example, the stylus is an auxiliary tool commonly used to operate smart phones. However, in the prior art, the stylus could not be directly connected to the network. Even with the integration of the stylus and the capturing module, it is not convenient for the stylus to perform two-way signal transmission function with the smart phone, thus making it inconvenient for users to use the stylus to communicate.

Therefore, it is necessary to provide a new wireless docking station to solve the problems of the prior art.

SUMMARY OF THE INVENTION

It is a main object of the present invention to provide a wireless docking station, which can work with a stylus in place of a webcam.

To achieve the above object, the present invention provides a wireless docking station. The wireless docking station is used for arranging a stylus for signal transmission with an external electronic device. The stylus includes an image capturing module and a first connection port and is selectively mounted on a notebook computer. The wireless docking station includes a placement, a second connection port, a wireless transmission module, a microphone, and a speaker. The placement is used for placing the stylus. When the stylus is placed at the placement, the second connection port is electrically connected to the first connection port of the stylus. The wireless transmission module is connected to the external electronic device, when the image capturing module captures an image, the wireless transmission module transmits the image to the external electronic device. The microphone is used for receiving an external sound signal and transmitting the external sound signal to the external electronic device via the wireless transmission module. The speaker is used for receiving and outputting an output sound signal from the external electronic device via the wireless transmission module.

DETAILED DESCRIPTION OF THE PREFERRED EMBODIMENT

In order to make the structure and characteristics as well as the effectiveness of the present invention to be further understood and recognized, the detailed description of the present invention is provided as follows along with embodiments and accompanying figures.

Figure 1:
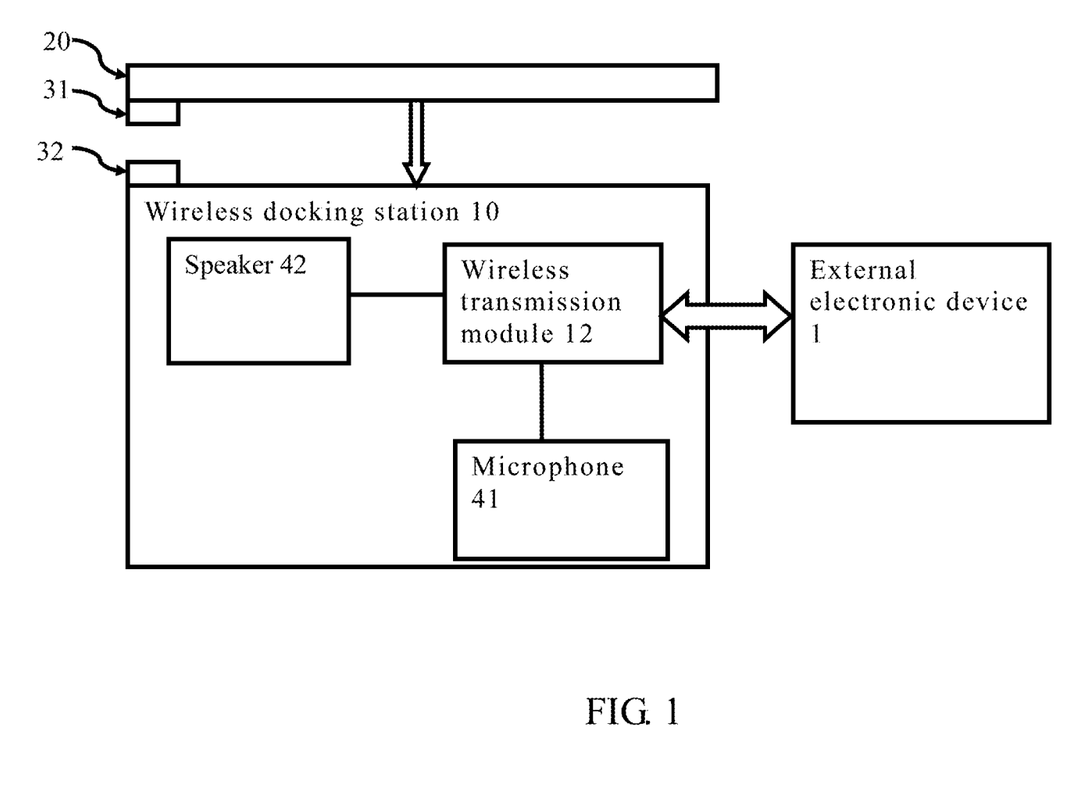
FIG. 1 illustrates a structural view of a wireless docking station of the present invention.

Please refer to FIG. 1 for a structural view of a wireless docking station of the present invention.

In an embodiment of the present invention, the wireless docking station 10 is used for arranging a stylus 20 such that the stylus pen 20 is electrically connected to a second connection port 32 of the wireless docking station 10 via a first connection port 31, thereby transmit a signal to an external electronic device 1 via a wireless connection module 12 in the wireless docking station 10. The external electronic device 1 may be a smart phone or a tablet computer, or any other suitable devices. Thus, the stylus 20 can transmit signals to the external electronic device 1. The wireless transmission module 12 of the wireless docking station 16 can also establish a connection with the external electronic device 1 by using a communication protocol such as a Wi-Fi wireless signal or a Bluetooth wireless signal, and receive signals from the external electronic device 1; nevertheless, the invention is not limited to the transmission methods described above. The wireless docking station 10 further includes a microphone 41 and a speaker 42, which are both electrically connected to the wireless transmission module 12. The microphone 41 is used for receiving an external sound signal and transmitting the external sound signal to the external electronic device 1 via the wireless transmission module 12. The speaker 42 is used for receiving and sending an output sound signal from the external electronic device 1 via the wireless transmission module 12. Therefore, the wireless docking station 10 can perform bidirectional video and audio signal transmission with the external electronic device 1. When the stylus 20 is used, the image capturing module 21 of the stylus 20 can be used in place of a webcam.

Figure 2A:
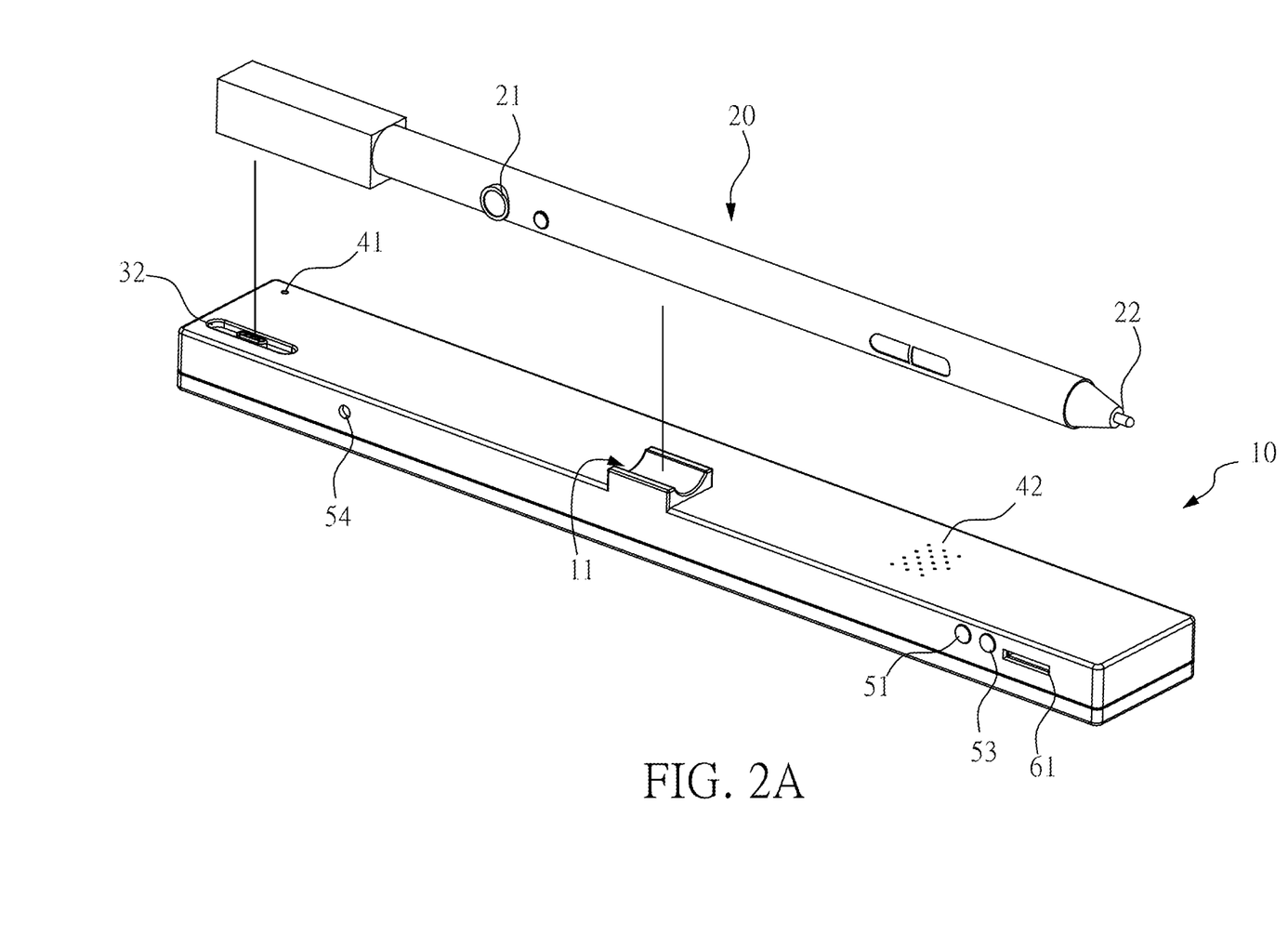
FIG. 2A illustrates a view showing the appearance of a wireless docking station of the present invention when a stylus is mounted.
Figure 2B:
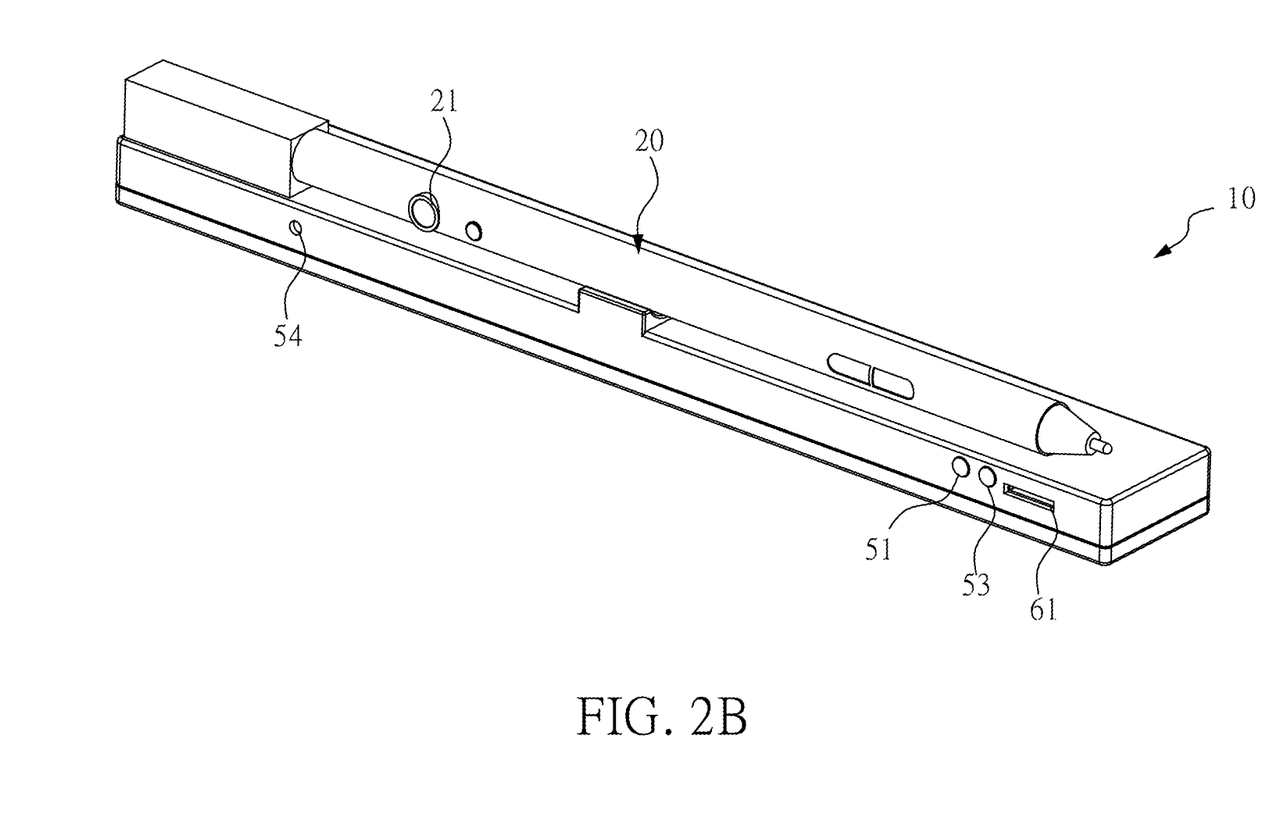
FIG. 2B illustrates a view showing the appearance of the wireless docking station of the present invention after the stylus is mounted.
Figure 2C:
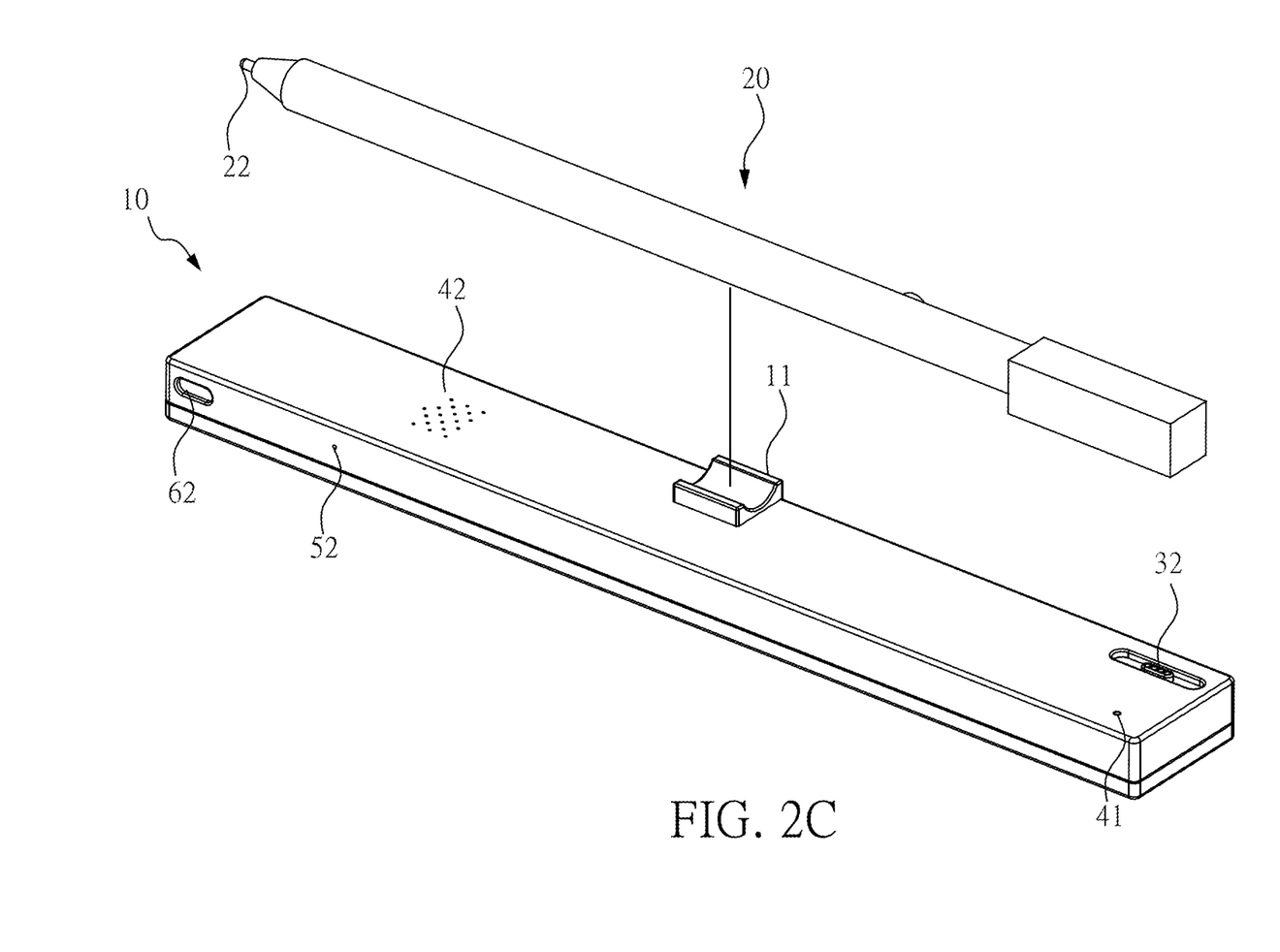
FIG. 2C illustrates a view showing the appearance of one side of the wireless docking station of the present invention.

Now please refer to FIG. 2A for a view showing the appearance of a wireless docking station of the present invention when a stylus is mounted, FIG. 2B for a view showing the appearance of the wireless docking station of the present invention after the stylus is mounted, and FIG. 2C for a view showing the appearance of one side of the wireless docking station of the present invention.

Figure 3:
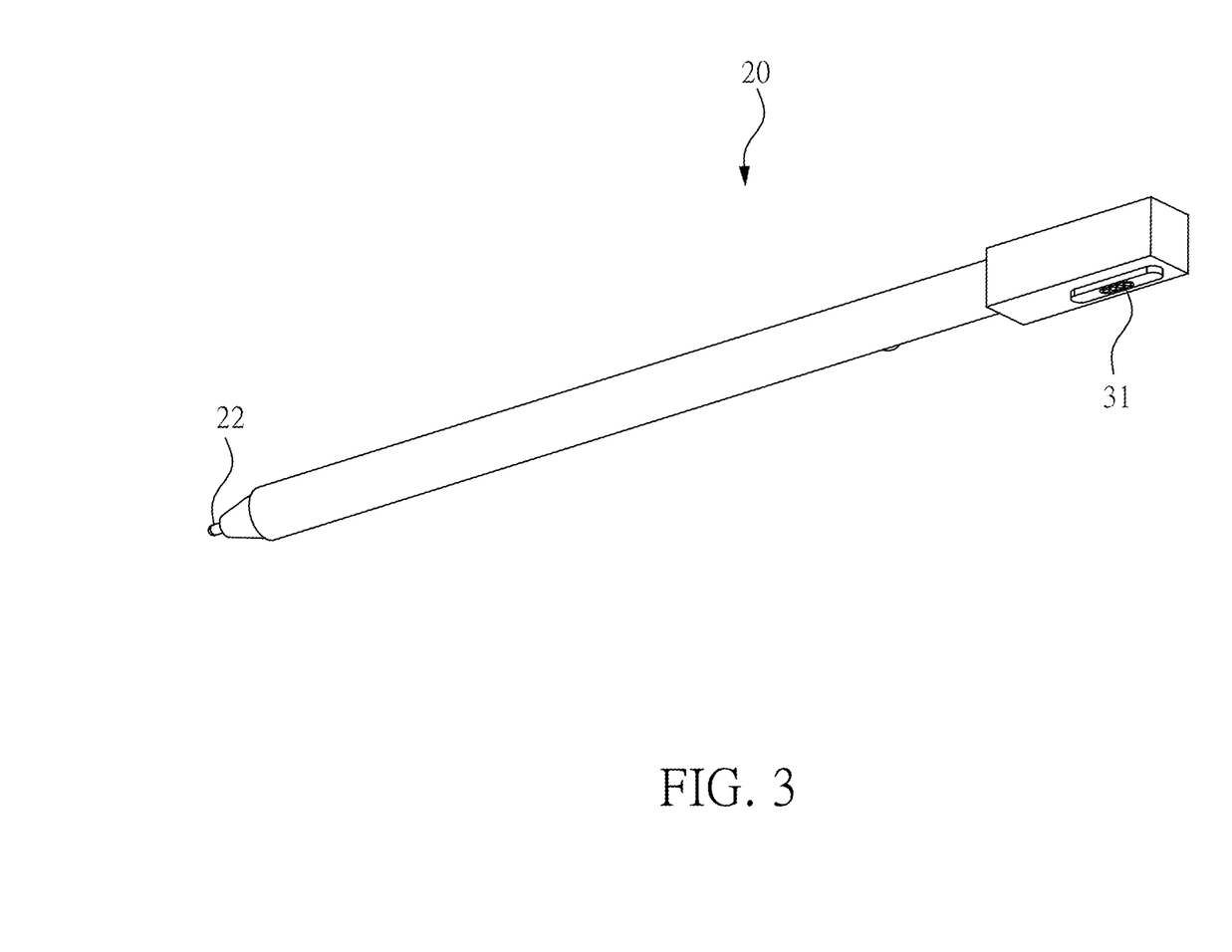
FIG. 3 illustrates a view showing the appearance of another side of the wireless docking station of the present invention.

As can be seen from FIG. 2A and FIG. 2B, the stylus 20 includes an image capturing module 21, a tip 22, and a first connection port 31. The image capturing module 21 can be used for capturing moving images or taking pictures. The tip 22 of the stylus pen 20 can be used in a general touch screen, and the first connection port 31 can be used for electrically connecting with the second connection port 32 of the wireless docking station 10. The first connection port 31 is shown in FIG. 3, which illustrates a view showing the appearance of another side of the wireless docking station of the present invention. In an embodiment of the invention, the first connection port 31 is a female connector, and the second connection port 32 is a male connector, but the invention is not limited thereto. In addition, the first connection port 31 and the second connection port 32 both can be magnetic, so the stylus 20 and the wireless docking station 10 can be attracted by the magnetic force between the first connection port 31 and the second connection port 32. When the stylus 20 and the wireless docking station 10 are electrically connected with each other, the two will not loosen due to slight shaking.

Figure 4:
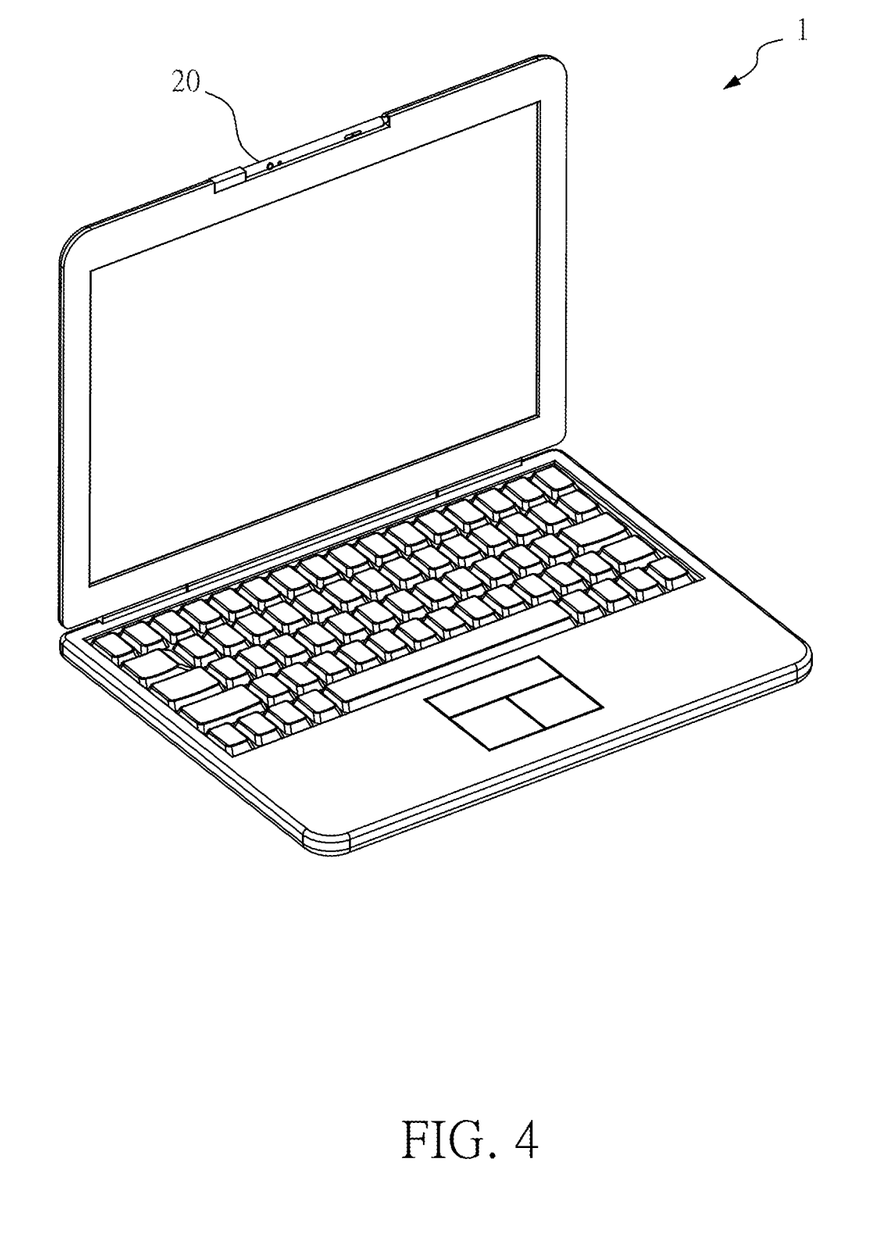
FIG. 4 illustrates a view showing the appearance of the stylus of the present invention mounted on a notebook computer.

On the other hand, now please refer to FIG. 4, which illustrates a view showing the appearance of the stylus of the present invention mounted on a notebook computer.

The stylus 20 can also be selectively mounted on a notebook computer 2. The stylus 20 can be both electrically and magnetically connected to the notebook computer 2 via the first connection port 31. Therefore, the notebook computer 2 can directly use the image capturing module 21 of the stylus 20 to shot videos or taking pictures.

The wireless docking station 10 of the present invention may further include a placement 11, a shutter button 51, a reset button 52, a power button 53, an indicator light 54, an external reading slot 61, and an external connection port 62. The placement 11 has a recess for matching the shape of the stylus 20, after the stylus 20 and the wireless docking station 10 are connected by the magnetic force between the first connection port 31 and the second connection port 32, the stylus 20 can be placed at the placement 11. The shutter button 51 is used for controlling the image capturing module 21 of the stylus 20. When the shutter button 51 is pressed, the stylus 20 can perform image capturing. The reset button 52 is used for controlling the wireless docking station 10 to return to an original setting. The power button 53 is used for turning on/off the wireless docking station 10. The indicator light 54 can be a single color or a multi-color LED light for displaying the use state of the stylus 20. The external reading slot 61 is used for installing a memory card, and can be used for storing images or photos captured by the image capturing module 21 of the stylus 20. The external reading slot 61 can be applied to an SD card, a Micro-SD card, or a Nano-SD card, etc., and the present invention is not limited thereto. The external connection port 62 can be a USB port for electrically connecting to a transmission line, thereby allowing the wireless docking station 10 to be charged, besides, the external connection port 62 can be used for transmitting signals of the wireless docking station 10 to other electronic devices via a wired connection, or any other possible means.

Therefore, when working with the stylus 20, the wireless docking station 10 can capture a video or take a picture by using the image capturing module 21 of the stylus 20 in place of a webcam, and use the microphone 41 and the speaker 42 to perform two-way signal transmission with the external electronic device.

It is noted that each module of the wireless docking station 10 can be configured to be a hardware device, a software program combined with a hardware device, a firmware combined with a hardware device, etc., but the present invention is not limited thereto. In addition, the present embodiment is merely illustrative of a preferred embodiment of the present invention, and in order to avoid redundancy, all possible combinations of variations are not described in detail. However, those skilled in the art will appreciate that the various modules or components described above are not necessarily required. In order to implement the invention, other well-known modules or elements with more detailed functions may also be included. Each module or component may be omitted or modified as it deems necessary, and no other modules or components may exist between any two modules.

It can be seen that the wireless docking station 10 of the present invention can conveniently work with the stylus 20, so that the combination of the stylus pen 20 and the wireless docking station 1 can replace the webcam for multi purposes.

It is noted that the above-described embodiment is merely illustrative of a preferred embodiment of the present invention, and in order to avoid redundancy, all possible combinations of variations are not described in detail. However, those skilled in the art will appreciate that the various modules or components described above are not necessarily required. In order to implement the present invention, other well-known modules or elements with more detailed functions may also be included. Each module or component may be omitted or modified as it deems necessary, and no other modules or components may exist between any two modules. As long as they do not deviate from the basic structure of the present invention, various changes and modifications may be made to the described embodiments without departing from the scope of the invention as disposed by the appended claims.

What is claimed is:

1. A wireless docking station for arranging a stylus for signal transmission with an external electronic device, wherein the stylus comprises a first connection port, and is selectively mounted on a notebook computer, the wireless docking station comprising:
    a placement for placing the stylus;
    a second connection port, when the stylus is placed at the placement, the second connection port is electrically connected to the first connection port of the stylus;
    a microphone for receiving an external sound signal and transmitting the external sound signal to the external electronic device; and
    a speaker for receiving and outputting an output sound signal from the external electronic device, wherein
    the wireless docking station is configured to be connected to the external electronic device,
    when the stylus is configured to capture an image, the wireless docking station is configured to transmit the image to the external electronic device, and
    the wireless docking station is configured to transmit the external sound signal to the external electronic device received by the microphone and to receive the output sound signal from the external electronic device.

2. The wireless docking station as claimed in claim 1 further comprising a shutter button for controlling the stylus for capturing image to capture the image.

3. The wireless docking station as claimed in claim 1 further comprising an external reading slot for installing a memory card.

4. The wireless docking station as claimed in claim 1 further comprising an external connection port for electrically connecting with a transmission line.

5. The wireless docking station as claimed in claim 1 further comprising a reset button for controlling the wireless docking station to return to an original setting.

6. The wireless docking station as claimed in claim 1 further comprising a power button for turning on/off the wireless docking station.

7. The wireless docking station as claimed in claim 1 further comprising an indicator light for displaying a use state of the stylus.

8. The wireless docking station as claimed in claim 1, wherein the placement has a recess for matching the shape of the stylus.

9. The wireless docking station as claimed in claim 1, wherein the second connection port is connected to the first connection port of the stylus by a magnetic attraction.

\* \* \* \* \*